Dec. 22, 1931.  H. W. HOW  1,837,964
EVAPORATOR
Filed July 11, 1929   3 Sheets-Sheet 1

Inventor
Harlan W. How
By Popp and Powers
Attorneys

Dec. 22, 1931.     H. W. HOW     1,837,964
EVAPORATOR
Filed July 11, 1929     3 Sheets-Sheet 2
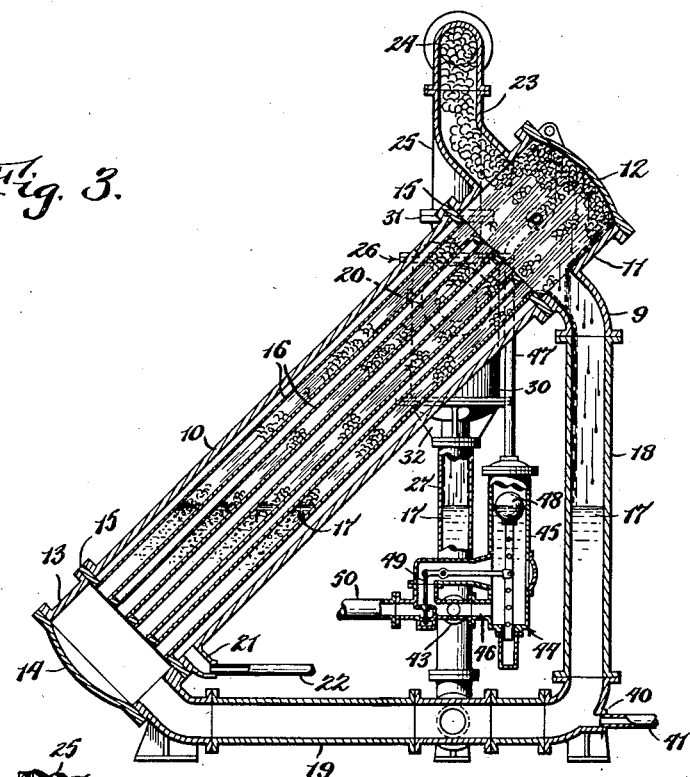
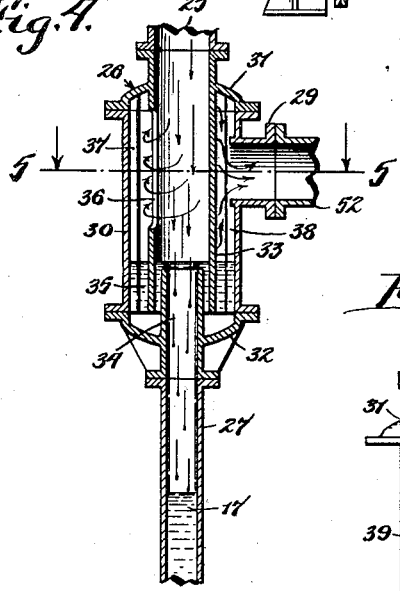
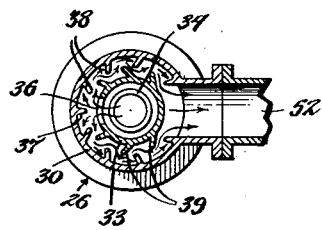
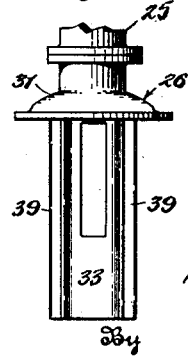

Dec. 22, 1931.　　　　H. W. HOW　　　　1,837,964
EVAPORATOR
Filed July 11, 1929　　　3 Sheets-Sheet 3

Jet Condenser

Inventor
Harlan W. How
By Pogo and Power
Attorneys

Patented Dec. 22, 1931

1,837,964

UNITED STATES PATENT OFFICE

HARLAN W. HOW, OF WARREN, PENNSYLVANIA, ASSIGNOR TO STRUTHERS WELLS-TITUSVILLE CORPORATION, OF WARREN, PENNSYLVANIA, A CORPORATION OF MARYLAND

EVAPORATOR

Application filed July 11, 1929. Serial No. 377,540.

This invention relates to an evaporator and liquid separator therefor and more particularly to a high velocity evaporator and a separator which are designed to utilize the velocity of the vapor and the entrained liquor therein for separating the liquor from the vapor although the separator can also be used in other installations where it is desired to separate entrained liquid from a gas. The high velocity evaporator shown will effect the concentration of nearly all liquors, with the exception of those that crystallize or salt out during the evaporation process.

The principal object of this invention is to provide an evaporator in which the vapor and the entrained liquor are handled throughout the apparatus at high velocity, the separation and return of the entrained liquor or mist being effected by the high velocity of the vapor. By this means the evaporator is exceptionally efficient and rapid in its action, and is particularly adapted to the handling of liquors which have a tendency to foam, as the high velocity of the vapors and the attendant high velocity of the liquor through the tubes and against the baffle means which separate the liquor from the vapor through the velocity thereof, causes the foam to be broken up.

Another object is to provide an evaporator which, by separating the liquor from the vapor through its velocity, permits of a reduction of the vapor space and thereby provides a more compact apparatus. In the present evaporator, the customary large vapor space has been purposely abandoned and the passage kept compact in order that both the velocity of the vapor and the entrained liquor be kept at the highest point consistant with a low pressure drop and a consequent low temperature loss. By keeping the passages of the proper area, high velocities are maintained throughout the apparatus, and these velocities are utilized to effect the entrainment separation in the most efficient manner.

A further aim is to provide means for separating the liquor from the vapor of an evaporator which will not only insure the separation of large and small shots or drops of liquor that come over with the vapor, but also insure the separation of the liquor which is entrained in mist form with the vapor, this separator, while particularly adapted for use in connection with an evaporator, being capable of use in other fields where the separation of entrained liquid from a vapor or gas is desired.

Another purpose is to provide an evaporating apparatus which is suited for either single effect or multiple effect evaporation, the present apparatus permitting in particular a low hydrostatic head of the liquor and makes available the maximum temperature differences between the effects and permitting a higher evaporative rate.

Another object is to provide a separator which is simple and efficient in its action, which is inexpensive in construction and which will remain in good working condition for a long period of time.

In the accompanying drawings;

Figure 3 is a vertical section through the evaporator showing the action of the upper cover of the vapor head in separating out the entrained liquor from the vapor to return the liquor to the liquor head.

Figure 4 is a fragmentary vertical section through the vapor separator and its connections with the high velocity evaporator.

Figure 5 is a horizontal section taken on line 5—5, Fig. 4.

Figure 6 is a side elevation of the inner member or baffle employed in the vapor separator shown in Figs. 4 and 5.

Similar numerals refer to like parts in each of the several views.

In its general organization this invention comprises an evaporator composed of upper and lower headers connecting inclined tubes in the lower ends of which tubes a constant head of the liquor to be evaporated is maintained, means for heating the tubes and causing the vapor with its entrained liquor to be discharged at high velocity against the cover of the upper head, a return conduit connecting the upper and lower headers and returning the liquor separated from the vapor by impact against the upper header cover, a vapor outlet pipe for the upper header which leads to a separator having a liquor outlet in line with the inlet and a series of baffles between the inlet and its vapor outlet so that any remaining entrained liquor is removed from the vapor by whipping it back and forth before leaving the vapor outlet, and a return conduit for conducting the separated liquor from the separator back to the liquor head.

Figure 1:
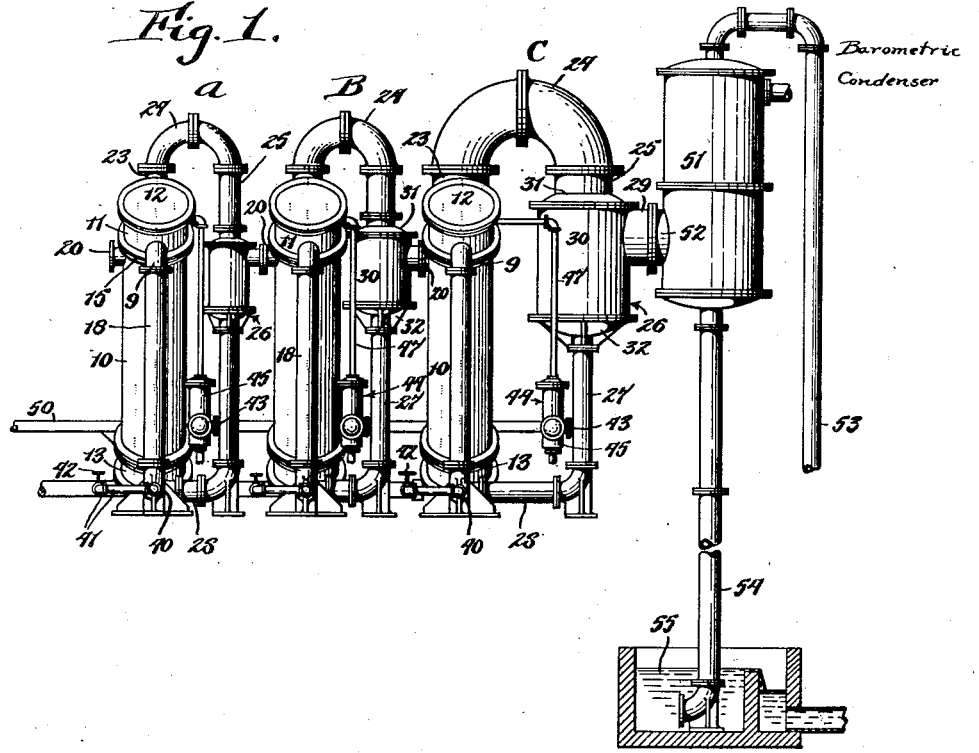
Figure 1 is a front elevation of a triple effect inclined high velocity evaporator made in accordance with my invention and showing the same equipped with a barometric condenser.
Figure 2:
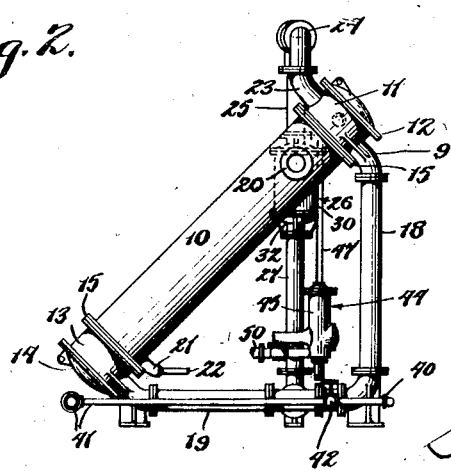
Figure 2 is a side elevation of a single inclined high velocity evaporator similar to those shown in Fig. 1.

The inclined evaporators shown in Figs. 1–3 are each preferably constructed as follows:

The numeral 10 represents an inclined cylindrical shell to the upper end of which is secured an upper cylindrical header 11 having an upper cover 12 at its outer end and the cylindrical shell 10 having a lower cylindrical header 13 which has a lower cover 14 at its outer end. These parts are bolted or secured together in any suitable manner and between the headers 11, 13 and the cylindrical shell 10 upper and lower tube sheets 15 are interposed. These tube sheets support a plurality of tubes 16 which extend through the tube sheets and are expanded or otherwise suitably secured thereto.

The upper vapor header 11 is formed to provide an outlet 9 for the return of the entrained liquor to the liquor head 17, this outlet 9 being connected to a vertical return pipe 18 which is connected at its lower end to the lower header 13 of the evaporator by a horizontal pipe 19. The liquor head 17 is therefore in the lower part of the tubes, the lower header 13, the horizontal pipe 19 and the lower part of the vertical return pipe 17. In order to secure the best results, a low hydrostatic head is maintained, the liquor level, as best shown in Fig. 3, being at from one-fifth to one-third of the height of the tubes 16, depending upon the character of the material being evaporated.

The steam for evaporating the liquor in the tubes 16 is admitted through a steam inlet 20 at the side of the inclined cylindrical shell 10 near its upper end, as best shown in Figs. 1 and 2, although the steam inlet can be placed anywhere that conditions may require, and the condensed water from the shell 10 passes out through a condensate outlet 21 which is formed in the lower part of the shell 10 and is connected with a condensate pipe 22.

The liquor in the tubes 16 is caused to boil by the live steam surrounding these tubes and liquor is thrown up and carried forward by this boiling action and the velocity of the vapors generated. Since a low hydrostatic head is maintained in the tubes, the upper part of the tube surfaces is under no hydrostatic head whatever, and for this reason perform at the highest efficiency in evaporating the liquor thrown up by the boiling liquor head in the lower parts of these tubes.

The vapor with a certain amount of entrained liquor in the form of large shots and mist is projected or blown out of the upper ends of the tubes 16 at a high velocity, as best shown in Fig. 3. This projected vapor and entrained liquor strikes the upper cover plate 12 and by reason of the high velocity, the greater part of the entrained liquor striking the upper cover plate 12 is separated from the vapor and flows down the cover plate 12, and along the upper header 11 to the outlet 9 from which it flows down the vertical return pipe 18 and is returned to the liquor head 17 in the lower part of this vertical return pipe.

The vapor with such entrained liquor as is not separated by being thrown against the upper cover plate, passes out through a vapor outlet 23 formed in the upper side of the upper vapor header 11 and passes around a bend 24 to a vertical pipe 25 which connects with a separator indicated generally at 26. This separator 26 is designed to separate all of the remaining liquor entrained in the vapor as either mist or in the form of large shots, as hereinafter described, and the liquor separated from the vapor is returned to the head 17 by a vertical pipe 27 which is connected to the lower end of the separator 26 and at its lower end is connected by a horizontal pipe 28 to the horizontal pipe 19 below the inclined shell 10. Each separator 26 is provided at one side with a vapor outlet 29 from which the vapor, which is substantially free from any entrained liquor, is withdrawn.

The separator 26 is entirely efficient in its action and positively prevents entrained liquids, either as a mist or in the form of large shots from passing over with the vapor and while it is shown as used in connection with an evaporator, it is obvious that it can be used wherever it is desired to separate entrained liquid from a gas traveling at high velocity as well as in connection with an evaporator. This separator 26 is preferably constructed as follows:

Referring more particularly to Figs. 4–6, the numeral 30 represents a vertically disposed cylindrical shell in one side of which the vapor outlet 29 is formed. At its upper end this vapor separator shell 30 is closed by a head 31 and at its lower end by a head 32, these heads being secured to the shell in any suitable manner. The upper head is connected to the pipe 25 through which the vapor with its entrained liquor is introduced into the separator and is formed to provide a depending tubular baffle 33 which extends substantially to the lower head 32. The lower head is connected to the liquor outlet pipe 27 and is formed to provide an upwardly extending overflow pipe 34 which projects up into the tubular baffle 33. The liquor 35 separated from the vapor collects in the lower part of the separator and since the overflow pipe 34 is above the lower end of the tubular baffle 33, a liquor seal is provided, this liquor seal eliminating the necessity of making a mechanically tight joint at the bottom.

Since the vapor with its entrained liquor enters the tubular baffle 33 at high velocity, it is apparent that any large shots of entrained liquor continue in their downward path and pass directly through the overflow pipe 34 into the vertical pipe 27 where they join the liquor head 17.

The vapor with the remaining entrained mist thereupon passes through a vertical slot 36 which is provided in the side of the tubular baffle 33 opposite to the vapor outlet 29 in the shell 30.

As best shown in Fig. 5, the shell 30 of the separator is formed to provide an inwardly extending, vertical dividing rib 37 which projects towards the center of the slot 36 and divides the vapor and mist emerging from the slot into two streams, these streams passing between the tubular baffle 33 and the shell 30 on opposite sides of the tubular baffle 33. Along the path of each of these streams, the separator shell is formed to provide a plurality of spaced inwardly projecting ribs 38 which extend obliquely against the flow of the vapor and entrained liquor. Between these ribs 38, the tubular baffle 33 is formed to provide a plurality of similar ribs 39. It is therefore apparent that as the two streams of vapor with the entrained liquor pass from the slot 36 to the outlet 29, they are whipped back and forth between the ribs 38 and 39 and as the streams are traveling at a high rate of speed any remaining entrained mist is thrown against the ribs where it collects and flows down to the water trap 35 and over the overflow into the main liquor head 17 to be recirculated.

Any suitable means, such as a liquor outlet 40 at the foot of the return pipe 18 can be provided for withdrawing the liquor when it has been evaporated to the required degree. This outlet can be connected to a liquor outlet pipe 41 which is controlled by a valve 42. The admission of liquor is preferably controlled so as to maintain a constant head of liquor, it being of prime importance that the hydrostatic head be kept low and also uniform for the best results. For this purpose, the liquor inlet 43 is controlled by a float valve indicated generally at 44. This float valve, as shown, is composed of a float valve chamber 45 which is connected at its lower end to the liquor head by a branch line 46 and at its upper end is connected by a pipe 47 with the upper header 11 so that the level in the float chamber is always the same as the main liquor head 17. In this float valve chamber is arranged a float 48 which has an adjustable connection with an inlet valve 49, this connection being such that when the liquor head 17 drops, the float 48 opens the valve and permits liquor from the inlet pipe 50 to enter the liquor inlet 43 and restore the liquor head 17 to its proper level.

The evaporator as described can be used alone as a single effect evaporator, or a battery of them can be connected together to provide a multiple effect evaporator.

Figure 7:
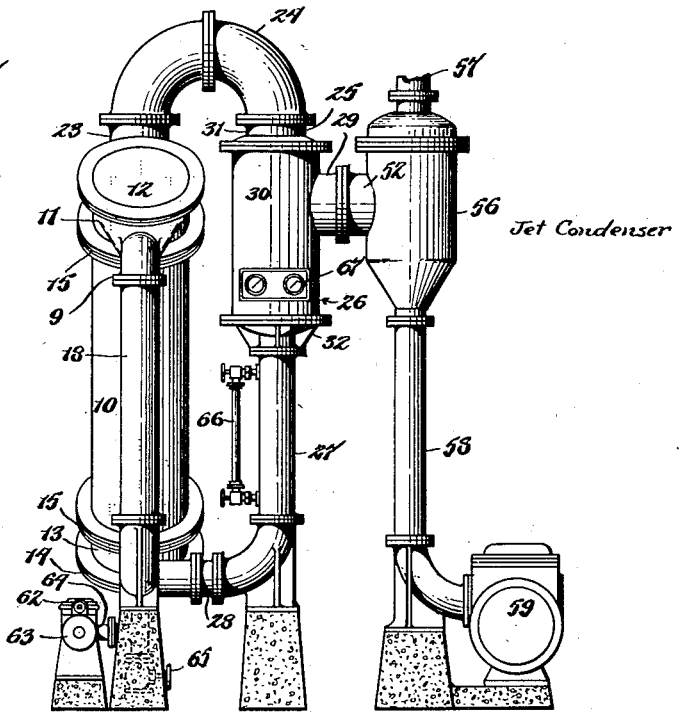
Figure 7 is a front elevation of a modified form of inclined single effect high velocity evaporator made in accordance with this invention, the same being shown as equipped with a jet condenser and a wet vacuum pump.

When used as a single effect evaporator, the exhaust of the vapor can be effected either by means of the baromatic condenser shown in Fig. 1 or by the jet shown in Fig. 7. The barometric condenser shown in Fig. 1 comprises the usual barometric condenser 51 having an inlet connection 52 with the vapor outlet 29 of the separator 26, a vacuum line 53 connected to a vacuum pump (not shown), and a condensate outlet line 54 which is not less than thirty-four feet in length and has its lower end immersed in a bath of water 55. The jet condenser shown in Fig. 7 comprises the usual jet condenser 56 having its inlet 52 connected to the vapor outlet 29 of the separator and having the usual water inlet 57 and outlet pipe 58 which connects with a wet vacuum pump 59, driven by a steam engine 60. A surface condenser of any usual design can also be employed to exhaust the vapor. The evaporator could also be operated as a single effect evaporator with the vapor exhausting into the atmosphere if conditions should warrant such a use.

As shown in Fig. 1, any number of individual evaporators can be arranged to provide a multiple effect evaporator, a triple effect evaporator being shown and the individual evaporators being indicated at A, B and C. With such an arrangement the steam inlet 20 of the first evaporator A is connected with the steam line and its vapor outlet 29 from its vapor separator 26 is connected to the steam inlet 20 of the second evaporator B. In the same manner the vapor outlet 29 from the vapor separator 26 of the second evaporator B is connected to the steam inlet of the third evaporator C and the vapor outelt 29 of this last evaporator C is connected to the inlet 52 of either the barometric condenser 51 shown in Fig. 1 or the jet condenser 56 shown in Fig. 7.

Figure 8:
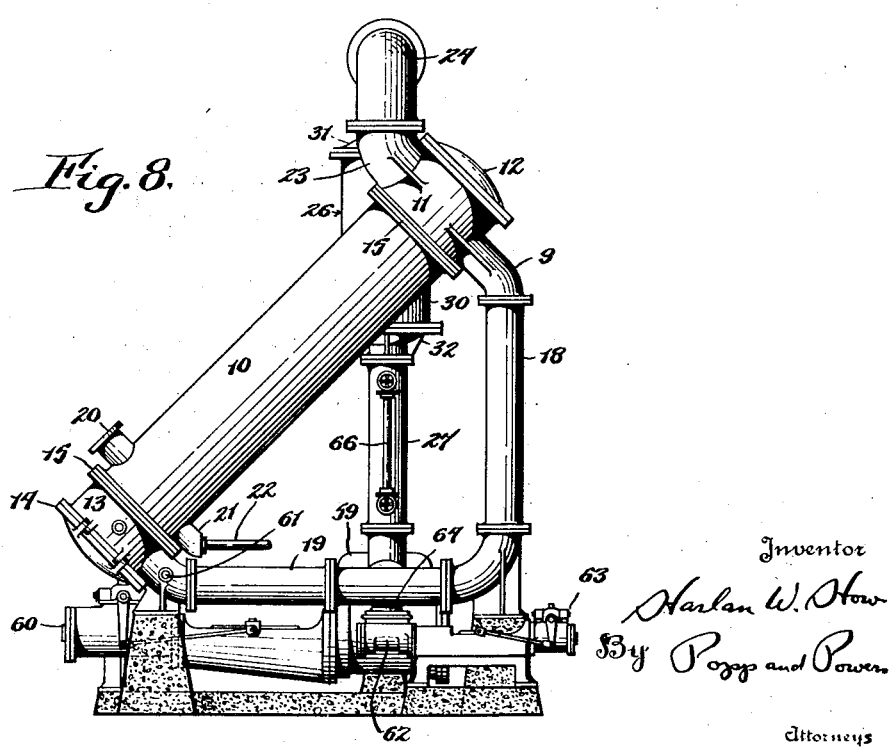
Figure 8 is a side elevation of the modified form of inclined single effect high velocity evaporator shown in Fig. 7.

The modified form of the invention shown in Figs. 7 and 8 is substantially similar to the construction shown in Figs. 1-6, except that its steam inlet is arranged at the lower end of the evaporator shell 10 and the liquor feed 61 is located at the side of the lower horizontal pipe 19. The liquor discharge in this form is effected by a liquor discharge pump 62 which is driven by a steam engine 63, this, liquor discharge pump being connected with the lower horizontal pipe 19 of the evaporator by a pipe 64 which is also provided with a wash water valve 65. A liquor level gage 66 is also provided in this form of the invention, and suitable pressure gages 67 can be provided on the separator 26. In other respects this evaporator is constructed and functions in the same manner as the preferred construction.

As a whole this invention provides a simple and efficient evaporator in which the vapor is handled throughout at high velocity and in which the entrained liquor in the vapor is separated through the velocity of the same. The evaporator is also compact, is comparatively inexpensive in construction, will evaporate large quantities of liquor in a short time, and is arranged to insure the complete separation of all entrained liquor from the vapor.

I claim as my invention:

1. An evaporator, comprising a shell adapted to contain the liquor to be evaporated, means for heating the liquor in said shell, means initially separating a part of the entrained liquor from the vapor at the upper end of said shell and means providing a stable triangular support for said shell upon the floor and also returning the liquor separated from the vapor to said shell, comprising a vertical pipe connected with the upper end of said shell and receiving the said initially separated entrained liquor therefrom, a horizontal pipe connecting the lower end of said vertical pipe with the lower end of said shell, a vapor separator arranged at one side of said shell, piping rigidly connecting the upper end of said shell with said separator and conducting the vapor with the remaining entrained liquor from said shell to said separator, a vertical pipe depending from said separator and forming an outlet for the separated liquor and a horizontal pipe arranged at an angle to said first named horizontal pipe and returning the liquor from said separator to said shell, said horizontal pipes forming a three point triangular support for said shell and separator.

2. An evaporator, comprising a shell adapted to contain the liquor to be evaporated, means for heating the liquor in said shell, means initially separating a part of the entrained liquor from the vapor at the upper end of said shell and means providing a stable triangular support for said shell upon the floor and also returning the liquor separated from the vapor to said shell, comprising a vertical pipe connected with the upper end of said shell and receiving the said initially separated entrained liquor therefrom, a horizontal pipe connecting the lower end of said vertical pipe with the lower end of said shell, a vapor separator arranged at one side of said shell, piping rigidly connecting the upper end of said shell with said separator and conducting the vapor with the remaining entrained liquor from said shell to said separator, a vertical pipe depending from said separator and forming an outlet for the separated liquor and a horizontal pipe arranged at an angle to said first named horizontal pipe and connecting the lower end of said vertical pipe from said separator with said first named horizontal pipes forming a three point triangular support for said shell and separator.

3. An evaporator, comprising a shell adapted to contain the liquor to be evaporated, means for heating the liquor in said shell, means initially separating a part of the entrained liquor from the vapor at the upper end of said shell and means providing a stable triangular support for said shell upon the floor and also returning the liquor separated from the vapor to said shell, comprising a vertical pipe connected with the upper end of said shell and receiving the said initially separated entrained liquor therefrom, a horizontal pipe connecting the lower end of said vertical pipe with the lower end of said shell, a vapor separator arranged at one side of said shell, piping rigidly connecting the upper end of said shell with said separator and conducting the vapor with the remaining entrained liquor from said shell to said separator, a vertical pipe depending from said separator and forming an outlet for the separated liquor, a horizontal pipe arranged at an angle to said first named horizontal pipe and returning the liquor from said separator to said shell, and feet arranged at the outer ends of said horizontal pipes and forming a three point support for said shell and separator upon said floor.

In testimony whereof I hereby affix my signature.

HARLAN W. HOW.